United States Patent [19]
Grover

[11] 3,740,635
[45] June 19, 1973

[54] OVERSPEED SENSOR FOR SAFETY BRAKE SYSTEM

[75] Inventor: Scott C. Grover, Bountiful, Utah

[73] Assignee: Kenway Engineering, Incorporated, Woods Cross, Utah

[22] Filed: Oct. 5, 1971

[21] Appl. No.: 186,742

[52] U.S. Cl. ............................ 318/382, 187/29 R
[51] Int. Cl. .............................................. B66b 5/02
[58] Field of Search ................ 318/382, 369, 372, 318/273, 275, 463, 464; 187/29

[56] References Cited
UNITED STATES PATENTS

| | | | |
|---|---|---|---|
| 3,334,287 | 8/1967 | Jensen | 318/382 X |
| 3,474,886 | 10/1969 | Iordanidis | 187/29 |
| 3,601,227 | 8/1971 | Burch | 187/29 |

*Primary Examiner*—Harold Broome
*Assistant Examiner*—W. E. Duncanson, Jr.
*Attorney*—Lynn G. Foster

[57] ABSTRACT

A brake control system for elevating platforms comprising a timing relay connected to receive "Down" command signals, a meter relay connected to receive signals from a tachometer driven by the platform, and means responsive to signals from said timing relay and meter relay for controlling the elevating motor and brake systems of said platform.

7 Claims, 1 Drawing Figure

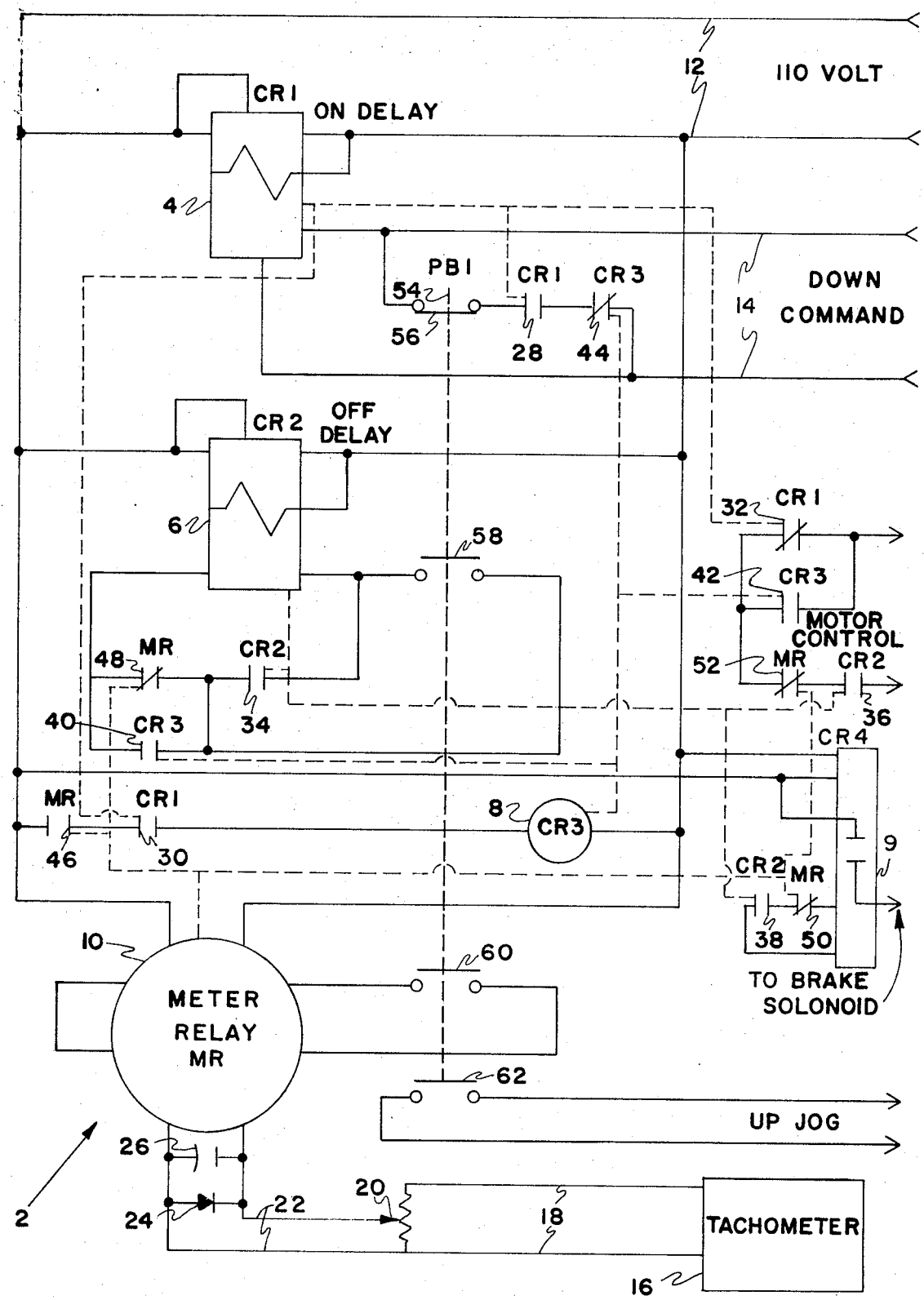

OVERSPEED SENSOR FOR SAFETY BRAKE SYSTEM

BACKGROUND

1. Field of Invention

This invention relates to brake systems and is particularly directed to brake systems for the elevating platforms of stacker cranes and the like.

2. Prior Art

The use of stacker cranes, and the like, having elevating platforms is well known. Moreover, it is common practice to provide braking systems for such platforms. However, the braking systems of the prior art have generally been mechanical devices which were actuated only in normal circumstances and did not provide fail-safe features. Some prior art braking systems have attempted to provide for emergency situations. However, when the brakes were applied, under such circumstances, the motor would continue to drive the platform and would either override the braking system or would cause the brakes to become so jammed that subsequent release of the brakes became virtually impossible and frequently resulted in damage to the brake system, motor, or the crane structure. Some systems would turn the motor off, but inertia would still cause the system to jam.

BRIEF SUMMARY AND OBJECTS OF THE INVENTION

These disadvantages of the prior art are overcome with the present invention and a novel braking system is provided which interconnects the brake control and motor control systems to prevent simultaneous actuation of these systems and to provide numerous fail-safe features.

The advantages of the present invention are preferably attained by providing an electrical brake control system comprising a tachometer having a plurality of electrical contacts adjustably positioned thereon, together with a plurality of relays which are responsive to signals from the tachometer to control the motor and brake systems, and self-test circuitry which assures fail-safe operation.

Accordingly, it is an object of the present invention to provide an improved brake control system for the elevating platforms of stacker cranes and the like.

Another object of the present invention is to provide a brake control system for the elevating platform of stacker cranes and the like which interconnects with the motor control system to prevent simultaneous actuation of the motor and brake.

A further object of the present invention is to provide a brake control system for the elevating platform of stacker cranes and the like which is self-testing and fail-safe.

A specific object of the present invention is to provide an electrical brake control system comprising a tachometer having a plurality of electrical contacts adjustably positioned thereon, together with a plurality of relays which are responsive to signals from the tachometer to control the motor and brake systems, and self-test circuitry to assure fail-safe operation.

These and other objects and features of the present invention will be apparent from the following detailed description, taken with reference to the figures of the accompanying drawings.

BRIEF DESCRIPTION OF THE DRAWINGS

The one FIGURE is a circuit diagram of a brake control system embodying the present invention.

DETAILED DESCRIPTION OF THE ILLUSTRATED EMBODIMENT

In that form of the present invention chosen for purposes of illustration in the drawing, the FIGURE shows a brake control system, indicated generally at 2, having timing relays 4 and 6, control relays 8 and 9, and a tachometer relay 10 connected, in parallel, across power lines 12 which supply electrical power from a suitable source, not shown. The timing relay 4 also receives "Down" command, via conductors 14, from the platform elevating control means, not shown. In addition, a tachometer 16 is connected to a wheel, or the like, of the elevating platform and establishes an electrical signal having a magnitude indicative of the rate of movement of the platform. The output of tachometer 16 is supplied via conductors 18, potentiometer 20 and conductors 22 to the meter relay 10. A diode 24 and capacitor 26 are connected in parallel with each other across conductors 22.

As shown, timing relay 4 controls two normally open contacts 28 and 30 and a normally closed contact 32. Timing relay 6 controls three normally open contacts 34, 36 and 38. Control relay 8 controls two normally open contacts 40 and 42 and a normally closed contact 44. Meter relay 10 controls one normally open contact 46 and three normally closed relays 48, 50 and 52. Contacts 28 and 44 are connected in series with each other across the "Down" command input conductors 14. Contacts 32 and 42 are connected in parallel with each other and in series with contacts 36, 52 and the "Down" control of the elevating motor. Contacts 34, 40 and 48 are connected to form a latching circuit for timing relay 6. Contacts 46 and 48 of meter relay 10 are actuated in response to a preselected minimum signal from tachometer 16 while contacts 50 and 52 are actuated in response to a preselected maximum signal. Contacts 30 and 46 are connected in series with control relay 8. Contacts 38 and 50 control the timer which provides the delay to the brake solenoid which actuates the brake on the elevating platform.

In use, under normal conditions, a "Down" command for the elevating platform is applied, via conductors 14, to timing relay 4, which, after a predetermined time delay, closes contacts 28 and 30 and opens contact 32. Opening of contact 32 serves to prevent the elevating motor from carrying out the "Down" command until the brake control system 2 has determined that such a command can be safely carried out. Closing of contact 30 is the first step toward actuation of control relay 8, while closing of contact 28 serves to "lock" the "Down" command into timing relay 4. Timing relay 6 is actuated by contacts 58 to close contacts 34, 36 and 38. Closing of contact 34 "locks-in" timing relay 6. Closing of contact 36 enables the actuation of the elevating motor, while closing of contact 38 completes the circuit for the brake solenoid which, then, releases the brake on the elevating platform. When a "Down" command is given and the platform begins to move, tachometer 16 sends a signal, indicative of speed, to meter relay 10 and, as soon as this signal reaches a preselected minimum value, meter relay 10 closes contact 46 and opens contact 48. Closing of contact 46 is the second step in actuating control relay 8 and under normal conditions, completes the energizing circuit to control relay 8. At the same time, opening of contact 48 and closing of contact 40 prevents timing relay 6 from dropping out. Actuation of control relay 8 closes contacts 40 and 42 and opens contact 44. Closing of contact 42 as contact 32 opens, keeps the energizing circuit for the elevating motor complete. Opening of contact 44 keeps timing relay 4 from latching.

There are four abnormal conditions which can occur and the brake control system of the present invention will prevent actuation of the elevating platform in the event of any of these. The first abnormal condition would be one wherein a "Down" command is applied, but no signal is received from the tachometer. This condition could result from the platform being jammed or from an internal failure, such as a broken wire or faulty tachometer. Should this condition exist, the "Down" command would be applied, via conductors 14, to actuate timing relay 4 which would, then, close contacts 28 and 30 and open contact 32. Since no signal is being received from tachometer 16, meter relay 10 will not be actuated and, consequently, control relay 8 cannot be energized or timing relay 6 deenergized. Contacts 32 open, but contacts 42 did not close. Therefore the motor is shut off. Thus, the brake control system of the present invention performs a self-testing function and will shut the motor off.

A second abnormal condition which may exist is one wherein a signal is received from the tachometer when no "Down" command signal has been applied. This could result from movement of the platform without a command and could be caused by a broken chain, drive linkage or motor brake failure. Under this condition, timing relay 4 would be inactive and the contacts 28, 30 and 32, controlled thereby, would remain in their original conditions. As soon as the movement caused the signal from tachometer 16 to reach the preselected minimum level, meter relay 10 would close contact 46 and open contact 48. Opening of contact 48 would deactuate timing relay 6 and, thus, open contact 38, thereby setting the safety brake. A third abnormal condition occurs if the platform accelerates to a dangerous speed. In this case, the signal from tachometer 16 will exceed a second preselected value, whereupon meter relay 10 will open contacts 50 and 52. Opening of contact 52 breaks the circuit to the elevating motor and, thus, shuts off the motor. Opening of contact 50 breaks the circuit to the brake solenoid, causing the contact of relay 9 to open and the brake to be applied.

The fourth abnormal condition would be a power failure; in which case, no signals would be received. However, since the brake solenoid must be energized to release the brake, this condition would simply leave the brake engaged.

In the event that any of the foregoing abnormal conditions occur, the brake control system will function, in the manner described, to deenergize the motor and engage the brake. To reset the system, after such operations, reset button 54 must be pressed. Pressing of reset button 54 serves to open contact 56 and to close contacts 58, 60 and 62. Opening of contact 56 removes any existing "Down" command "locked-in" the timing relay 4, while closing of contacts 58 and 60 serves to reset timing relay 6 and reset the meter relay 10. Closing of contact 62 supplies an "UP JOG" command to the elevating motor to raise the platform slightly to assure release of the brakes. Diode 24 serves to prevent actuation of motor relay 10 during upward movement of the platform, while capacitor 26 prevents actuation of meter relay 10 by transient signals.

Obviously, numerous variations and modifications may be made without departing from the present invention. Accordingly, it should be clearly understood that the form of the present invention described above and shown in the accompanying drawing is illustrative only and is not intended to limit the scope of the invention.

What Is claimed Is:

1. A brake control system for an elevating platform having an elevating motor, a brake and a brake actuating relay, said control system comprising:
   a timing relay,
   command means for supplying a "Down" command to said timing relay,
   a tachometer mounted for movement with said platform and establishing electrical signals indicative of predetermined minimum and maximum rates of such movement,
   a meter relay connected to receive said signals from said tachometer, and
   contact means responsive to actuation of said timing relay and said meter relay for controlling energizing of said motor and said brake relay in response to signals within the range defined by said predetermined maximum and minimum signals.

2. A brake control system for an elevating platform having an elevating motor, a brake and a brake actuating relay, said control system comprising:
   a timing relay,
   command means for supplying a "Down" command to said timing relay,
   a tachometer mounted for movement with said platform and establishing an electrical signal having a magnitude indicative of the rate of such movement,
   a meter relay connected to receive said signal from said tachometer,
   contact means responsive to actuation of said timing relay and said meter relay for controlling energizing of said motor and said brake relay,
   a first control relay having a first contact connected to control enabling of said motor and a second contact connected to control energizing of said brake relay,
   a second control relay having a first contact connected to control enabling of said motor,
   a locking circuit for locking said first control relay in actuation including a pair of contacts connected in parallel, one contact of said pair being controlled by said meter relay and the other contact of said pair being controlled by said second control relay, and
   an energizing circuit for said second control relay including a pair of contacts connected in series, one contact of said pair being controlled by said meter relay and the other contact of said pair being controlled by said timing relay.

3. The system of claim 2 wherein:
   system meter relay is operative to close the contact controlled by said meter relay in each of said pairs of contacts in response to the magnitude of the signal from said tachometer reaching a preselected minimum level.

4. A brake control system for an elevating platform having an elevating motor, a brake and a brake actuating relay, said control system comprising:
- a timing relay,
- command means for supplying a "Down" command to said timing relay,
- a tachometer mounted for movement with said platform and establishing an electrical signal having a magnitude indicative of the rate of such movement,
- a meter relay connected to receive said signal from said tachometer,
- contact means responsive to actuation of said timing relay and said meter relay for controlling energizing of said motor and said brake relay, and
- said meter relay being operative to open contacts controlling energizing of said motor and said brake solenoid in response to the magnitude of the signal from said tachometer reaching a preselected maximum level.

5. A brake control system for an elevating platform having an elevating motor, a brake and a brake actuating relay, said control system comprising:
- a timing relay,
- command means for supplying a "Down" command to said timing relay,
- a tachometer mounted for movement with said platform and establishing an electrical signal having a magnitude indicative of the rate of such movement,
- a meter relay connected to receive said signal from said tachometer,
- contact means responsive to actuation of said timing relay and said meter relay for controlling energizing of said motor and said brake relay, and
- means responsive to presence of a signal from said command means in the absence of a signal from said tachometer for actuating said contact means to deenergize said motor.

6. The system of claim 1 further comprising:
- means responsive to the presence of a signal outside the range of said minimum and maximum signals from said tachometer in the absence of a signal from said command means for actuating said contact means to deenergize said motor and to cause said brake solenoid to actuate the brake of said platform.

7. The method of controlling an elevating platform comprising the steps of:
- sensing issuance of a "Down" command to the elevating motor of said platform,
- sensing the rate of movement of said platform to be within a predetermined maximum and minimum value, and
- responding to absence of a signal from either of said sensing steps to prevent energizing of the elevating motor of said platform and to engage the safety brake of said platform.

* * * * *